US009875733B2

(12) United States Patent
Sanders

(10) Patent No.: US 9,875,733 B2
(45) Date of Patent: Jan. 23, 2018

(54) MICROPOROUS MEMBRANE LAMINATE FOR ACOUSTIC VENTING

(71) Applicant: Donaldson Company, Inc., Minneapolis, MN (US)

(72) Inventor: Jacob Sanders, Burnsville, MN (US)

(73) Assignee: Donaldson Company, Inc., Minneapoils, MN (US)

( * ) Notice: Subject to any disclaimer, the term of this patent is extended or adjusted under 35 U.S.C. 154(b) by 0 days.

(21) Appl. No.: 15/029,508

(22) PCT Filed: Oct. 14, 2014

(86) PCT No.: PCT/US2014/060463
§ 371 (c)(1),
(2) Date: Apr. 14, 2016

(87) PCT Pub. No.: WO2015/057693
PCT Pub. Date: Apr. 23, 2015

(65) Prior Publication Data
US 2016/0247499 A1 Aug. 25, 2016

Related U.S. Application Data

(60) Provisional application No. 61/891,268, filed on Oct. 15, 2013.

(51) Int. Cl.
*H04R 1/02* (2006.01)
*H04R 1/08* (2006.01)
(Continued)

(52) U.S. Cl.
CPC ............ *G10K 11/168* (2013.01); *B32B 5/028* (2013.01); *B32B 7/12* (2013.01); *B32B 27/12* (2013.01);
(Continued)

(58) Field of Classification Search
CPC ....... H04R 1/023; H04R 1/086; G10K 11/168
(Continued)

(56) References Cited

U.S. PATENT DOCUMENTS 4,949,386 A 8/1990 Hill
4,987,597 A 1/1991 Haertl
(Continued)

FOREIGN PATENT DOCUMENTS

EP 2219387 8/2010
JP 05320255 12/1993
(Continued)

OTHER PUBLICATIONS

"International Preliminary Report on Patentability," for PCT Application No. PCT/US2014/060463, dated Apr. 28, 2016 (9 pages).
(Continued)

*Primary Examiner* — Jeremy Luks
(74) *Attorney, Agent, or Firm* — Pauly, DeVries Smith & Deffner, LLC

(57) ABSTRACT

The technology described herein generally relates to a microporous membrane laminate for acoustic venting. In one embodiment, the technology disclosed herein is a polytetrafluoroethylene (PTFE) membrane having an average pore size between 0.05 µm and 2 µm and a scrim layer laminated to the PTFE membrane to form an acoustic membrane laminate. The acoustic membrane laminate has a thickness between 10 µm and 60 µm, and the scrim layer defines an average scrim opening between 0.20 mm2 and 5.0 mm². The acoustic membrane laminate exhibits an increased average insertion loss in a frequency range from 300 Hz to 3000 Hz compared to the PTFE membrane alone, and has a decreased total harmonic distortion relative to the PTFE
(Continued)

membrane alone. The acoustic membrane laminate has a water entry pressure that is substantially equal to that of the PTFE membrane.

19 Claims, 13 Drawing Sheets

(51) Int. Cl.
| | |
|---|---|
| *G10K 11/168* | (2006.01) |
| *B32B 5/02* | (2006.01) |
| *B32B 27/12* | (2006.01) |
| *B32B 27/32* | (2006.01) |
| *B32B 7/12* | (2006.01) |
| *B32B 37/06* | (2006.01) |
| *B32B 37/12* | (2006.01) |

(52) U.S. Cl.
 CPC ........... *B32B 27/322* (2013.01); *B32B 37/06* (2013.01); *B32B 37/12* (2013.01); *H04R 1/023* (2013.01); *H04R 1/086* (2013.01); *B32B 2307/10* (2013.01); *B32B 2457/00* (2013.01); *H04R 2499/11* (2013.01)

(58) Field of Classification Search
 USPC .......................................... 181/286, 291, 294
 See application file for complete search history.

(56) References Cited

U.S. PATENT DOCUMENTS

| | | | |
|---|---|---|---|
| 5,825,718 A | 10/1998 | Ueki et al. | |
| 5,828,012 A | 10/1998 | Repolle et al. | |
| 6,512,834 B1 | 1/2003 | Banter et al. | |
| 6,582,113 B2 | 6/2003 | Rogers | |
| 7,751,579 B2 | 7/2010 | Schulein et al. | |
| 8,141,678 B2 * | 3/2012 | Ikeyama ................ | C09J 7/0282 181/167 |
| 8,157,048 B2 | 4/2012 | Banter et al. | |
| 8,272,517 B2 | 9/2012 | Takiishi et al. | |
| 8,685,198 B2 | 4/2014 | Canonico et al. | |
| 8,724,841 B2 | 5/2014 | Bright et al. | |
| 9,317,068 B2 | 4/2016 | Sanders | |
| 2010/0206660 A1* | 8/2010 | Horie .................. | B29C 47/0021 181/175 |
| 2010/0247857 A1* | 9/2010 | Sanami ................... | H04M 1/18 428/138 |
| 2011/0117304 A1* | 5/2011 | Ueki ...................... | H04R 1/023 428/36.5 |
| 2011/0255728 A1 | 10/2011 | Abe et al. | |
| 2014/0060330 A1 | 3/2014 | Boyat et al. | |
| 2015/0304750 A1* | 10/2015 | Mori ...................... | H04R 1/023 381/334 |
| 2015/0373439 A1* | 12/2015 | Mori ...................... | H04M 1/03 381/334 |

FOREIGN PATENT DOCUMENTS

| | | |
|---|---|---|
| JP | 10165787 | 6/1998 |
| JP | 2003250188 | 9/2003 |
| JP | 2009029423 | 2/2009 |
| JP | 2009039869 | 2/2009 |
| JP | 2012081763 | 4/2012 |
| JP | 2012195928 | 10/2012 |
| JP | 2012253481 | 12/2012 |
| JP | 2013017226 | 1/2013 |
| JP | 2013102555 | 5/2013 |
| JP | 5329350 | 10/2013 |
| JP | 5513057 | 6/2014 |
| WO | 2014047406 | 3/2014 |
| WO | 2015057693 | 4/2015 |

OTHER PUBLICATIONS

"International Search Report and Written Opinion," for PCT Application No. PCT/US2014/060463, dated Feb. 3, 2015 (19 pages).
"First Office Action," for Chinese Patent Application No. 201480056489.2 dated Mar. 28, 2017 (13 pages) with English translation.
"Second Office Action," for Chinese Patent Application No. 201480056489.2 dated Sep. 27, 2017 (11 pages) with English translation.

* cited by examiner

MICROPOROUS MEMBRANE LAMINATE FOR ACOUSTIC VENTING

This application is being filed as a PCT International Patent application on Oct. 14, 2014 in the name of Donaldson Company, Inc., a U.S. national corporation, applicant for the designation of all countries and Jacob Sanders, a U.S. Citizen, inventor for the designation of all countries, and claims priority to U.S. Provisional Patent Application No. 61/891,268, filed Oct. 15, 2013, the contents of which are herein incorporated by reference in its entirety

FIELD OF THE TECHNOLOGY

The technology described herein generally relates to a microporous membrane laminate. More particularly, the technology described herein relates to a microporous membrane laminate for acoustic venting.

BACKGROUND

For a variety of electronics, exposure to water is of concern due to water damage that can occur. For this reason, many companies are transitioning to product designs that prevent water intrusion. In doing so, such products should also maintain clear acoustics for the microphones and speakers that are present in the device. Manufacturers would like to rate their products with a minimum of IPx7. This rating specifies that their products could survive being submerged to a depth of 1 meter for ½ hour without damage. The 1-meter depth is measured at the bottom of the device, and the water depth is at least 15 cm at the top of the device, according to this rating. A filter or vent is necessary for electronic devices to allow for pressure equalization, allowing the transducers to function properly.

Acoustic vents are used to protect speakers and microphones from water and dust. Often these vents contain of expanded polytetrafluoroethylene (PTFE) membranes. Typically, such vents take the form of a disc being secured with an adhesive tape to the electronic housing that covers a transducer. The PTFE membrane prevents water and/or dust from reaching the microphone or speaker, while also allowing the acoustic signal to pass through with minimal loss.

PTFE membranes are used because they can be manufactured to have low basis weight and high flexibility. These properties allow them to vibrate easily when excited by an acoustic signal, and transmit the acoustic signal to the other side without allowing liquid intrusion. In addition, PTFE membranes are gas permeable, allowing equalizations of differential pressures due to temperature changes, as well as the evacuation of moisture due to condensation. PTFE membrane also has high dust efficiency and can withstand high differential water pressure without any liquid water passing through.

In electronic environments, PTFE membranes can be exposed to mechanical abrasion, high differential pressures, and mechanical prodding. These conditions can damage the PTFE by creating holes or stretching the membrane until it touches surrounding surfaces, thus compromising its ability to vibrate and transmit sound. The PTFE membrane can also be difficult to handle during conversion to finished parts. For this reason, a support layer is often laminated to the PTFE membrane in general non-acoustic venting applications. The support layer is most commonly a polymeric fabric.

It is generally understood that lamination of a support layer to a PTFE membrane dampens the ability of the membrane to transmit an acoustic signal. Some have recognized that this dampening effect can be too great to be acceptable in modern acoustic applications, particularly portable electronic applications in which the size of the vent is relatively small.

The lamination of a support layer can also prevent the vent from achieving the necessary waterproof rating. Typically acoustic vents are coupled to an adhesive tape which is then coupled to the electronics housing. Often the adhesive tape is affixed to the top surface of the support layer and does not make sealing contact with the PTFE, which is at least partially due to the thickness of the support layer. As such, water can enter the space between the PTFE and the adhesive/support layer.

SUMMARY

The technology described herein generally relates to a microporous membrane laminate for acoustic venting. In one embodiment, the technology disclosed herein is a polytetrafluoroethylene (PTFE) membrane having an average pore size between 0.05 µm and 2 µm, and a scrim layer laminated to the PTFE membrane to form an acoustic membrane laminate. The acoustic membrane laminate has a thickness between 10 µm and 60 µm, and the scrim layer defines an average scrim opening between 0.20 mm$^2$ and 5.0 mm$^2$. The acoustic membrane laminate exhibits an increased average insertion loss in a frequency range from 300 Hz to 3000 Hz compared to the PTFE membrane alone, and has a decreased total harmonic distortion relative to the PTFE membrane alone. The acoustic membrane laminate has a water entry pressure that is substantially equal to that of the PTFE membrane.

Some embodiments of the technology disclosed herein relate to a method of manufacturing an acoustic venting assembly. A PTFE membrane having a particular water entry pressure and a thickness between 5 µm and 90 µm is provided, and a scrim layer is laminated to the PTFE membrane to form an acoustic laminate for use in an electronics enclosure. The acoustic laminate has a water entry pressure equal to the water entry pressure of the PTFE membrane alone, and the thickness of the acoustic laminate is less than 30% of the sum of the total thicknesses of the scrim layer before lamination and PTFE membrane before lamination. Generally, the thickness of the acoustic laminate is less than the thickness of the scrim material before lamination.

Yet another aspect of the technology disclosed herein relates to an acoustic vent. The acoustic vent has a PTFE membrane and a scrim layer laminated to a first side of the PTFE membrane to form an acoustic membrane laminate with an outer perimeter and a minimum water entry pressure of about 3 psi. A first adhesive is coupled to the first side of the PTFE membrane and the scrim layer in a perimeter region of the laminate membrane that establishes a water-tight seal that prevents water passing between the PTFE membrane and the scrim layer when immersed in 1 meter of water for 30 minutes (an IPx7 rating). A second adhesive is coupled to a second side of the PTFE membrane in the perimeter region of the laminate membrane to establish a water-tight seal with the laminate membrane. The first adhesive and the second adhesive cooperatively define an unbonded region of the laminate membrane, and the total harmonic distortion of the acoustic laminate, with or without adhesive, is less than the PTFE membrane alone.

The current technology may be more completely understood and appreciated in consideration of the following detailed description of various embodiments of the technology in connection with the accompanying drawings.

DETAILED DESCRIPTION

In some embodiments of the current technology, the membrane laminate can exhibit an average transmission loss that is at least double the average transmission loss of its membrane alone in the 300-5000 Hz frequency range. Contrary to conventional understanding of PTFE membranes with support layers, however, some embodiments of the membrane laminate disclosed herein demonstrate improved acoustic performance when compared to its membrane-only counterpart. As discussed further herein, some embodiments of the membrane laminate demonstrate not significantly worse or even improved acoustic performance as measured using different metrics, such as H1 frequency response/insertion loss measurements and harmonic distortion.

Figure 1:
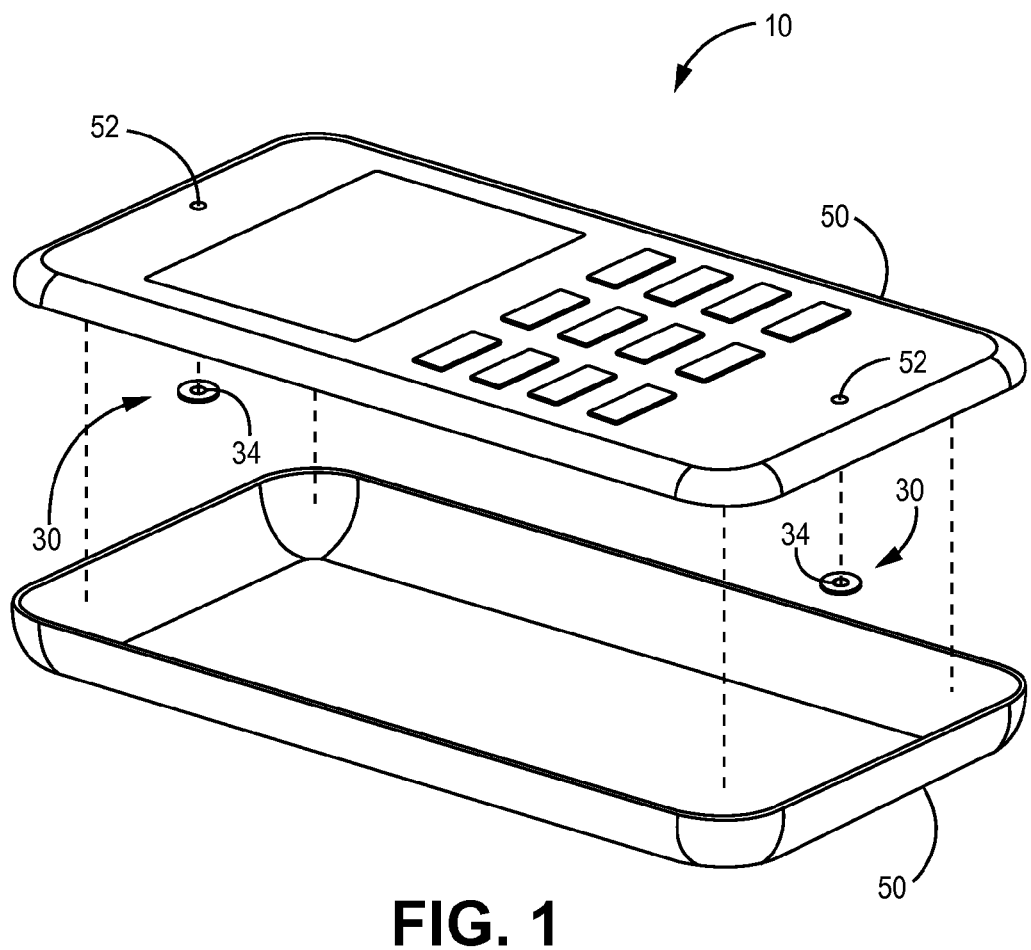
FIG. 1 depicts a schematic of an example implementation of the current technology.

FIG. 1 depicts a schematic of an example implementation of the current technology. An electronic assembly 10 has an enclosure 50 defining at least one opening 52 with an acoustic venting assembly 30 sealably disposed across each opening 52. The acoustic venting assembly 30 is generally configured to prevent entry of particulates, contaminant, and water through the opening 52 of the enclosure 50 while accommodating acoustic pressure waves passing through. The filtering efficiency of the acoustic venting assembly 30 is generally no less than 99% with particle size greater than or equal to 0.3 micron traveling at 10.5 ft/min. The electronic assembly 10 has an Ingress Protection Rating of at least IPx7. The number "7" in the IPx7 rating indicates that ingress of water in harmful quantities shall not be possible when the enclosure is immersed in up to 1 meter of water for 30 minutes. The 1-meter depth is measured at the bottom of the enclosure, and the water depth is at least 15 cm at the top of the enclosure, according to this rating. Test procedures are further defined in an international standard published by the International Electrotechnical Commission (IEC) and referred to as International Standard IEC 60529. The digit "x" in the IPx7 rating refers to the protection provided against the intrusion of solid objects and dust, and the level of protection is unspecified when an "x" is used in place of a number.

Figure 2:
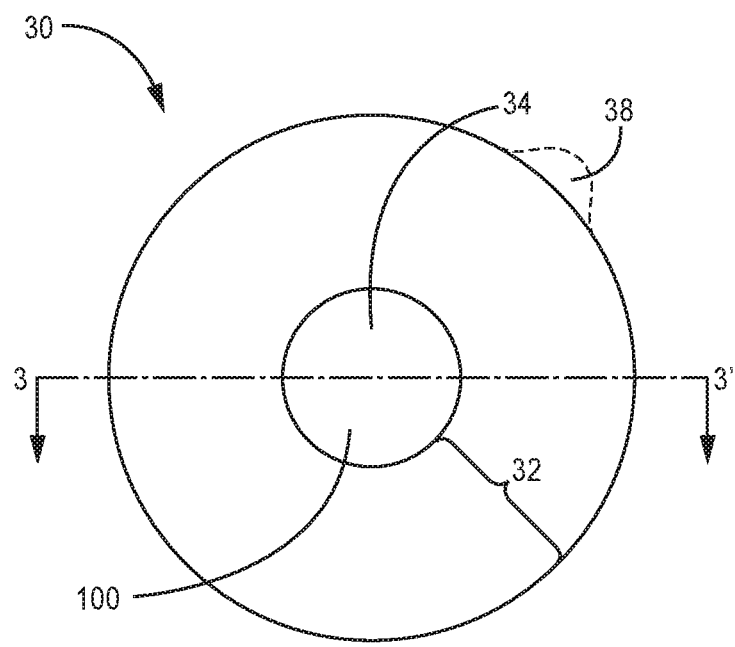
FIG. 2 depicts a facing view of an example acoustic venting assembly consistent with the technology disclosed herein.
Figure 3:
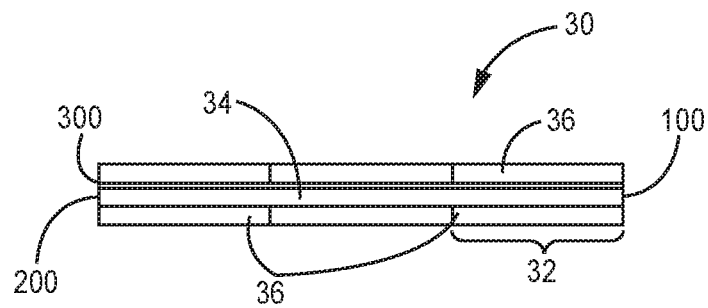
FIG. 3 depicts a cross-sectional view of the acoustic venting assembly of FIG. 2.

FIG. 2 depicts a facing view of an example acoustic venting assembly consistent with the implementation depicted in FIG. 1, and FIG. 3 depicts a cross-sectional view of the acoustic venting assembly in FIG. 2. The acoustic venting assembly 30 generally defines a perimeter region 32 (hereinafter "perimeter bonded region") that is configured to couple to the electronics enclosure 50 about the opening 52 (See FIG. 1). The acoustic venting assembly 30 also defines an inner region 34, which will be referred to as the "inner unbonded region," that allows sound transmission through a membrane laminate 100 and the opening 52 of the electronics enclosure 50. In FIGS. 2 and 3, the membrane laminate 100 extends across the perimeter bonded region 32 and the inner unbonded region 34. The membrane laminate 100 has a first layer 200 and a second layer 300, where the second layer 300 is substantially coextensive with the first layer 200. An adhesive layer 36 is disposed on the perimeter bonded region 32, leaving the inner unbonded region 34 substantially adhesive-free. The adhesive layer 36 can be on one or both sides of the membrane laminate 100. The adhesive layer 36 can be a pressure sensitive adhesive laminate, such as an adhesive tape. The adhesive layer 36 could also be a double-sided adhesive.

In some embodiments where there is an adhesive layer on both sides of the membrane laminate, the adhesive layers can generally extend from the unbonded region to the outer perimeter of the membrane laminate (depicted in FIG. 3). In at least one other embodiment, one adhesive layer can have a different shape from the other of the adhesive layer, such as by defining a tab 38 that extends beyond the perimeters of the membrane laminate and the other adhesive layer (depicted in FIG. 2). In an alternate embodiment, the membrane laminate has an outer perimeter that extends beyond the outer perimeters of the adhesive layers (not depicted herein).

The acoustic venting assembly 30 of FIGS. 1-3 can include additional layers and combinations of layers such as foam layers, adhesive layers, and gasket layers, as is generally known in the art. In at least one embodiment, a perimeter bonded region is not defined by an adhesive layer but, rather, is defined by insert molding, heat welding, or ultrasonic welding of the membrane laminate to the electronics housing or other components.

While FIGS. 1-3 depict the overall shape of the acoustic venting assembly 30 and the unbonded region 34 as circular, those having skill in the art will appreciate that the acoustic venting assembly, its perimeter bonded region and its inner unbonded region can all interchangeably have a variety of shapes that are consistent with the technology disclosed herein. For example, the acoustic venting assembly and/or its unbonded region could have an ovular shape or a rectangular shape. In at least one embodiment the acoustic venting assembly can define two or more unbonded regions.

As used herein, the term laminate means a structure made up of at least two layers of material, and/or the process to create a structure made up of at least two layers of material. In a variety of embodiments, one layer of the microporous membrane laminate is a PTFE membrane, and another layer of the microporous membrane laminate is a thermoplastic woven fiber scrim.

Figure 4:
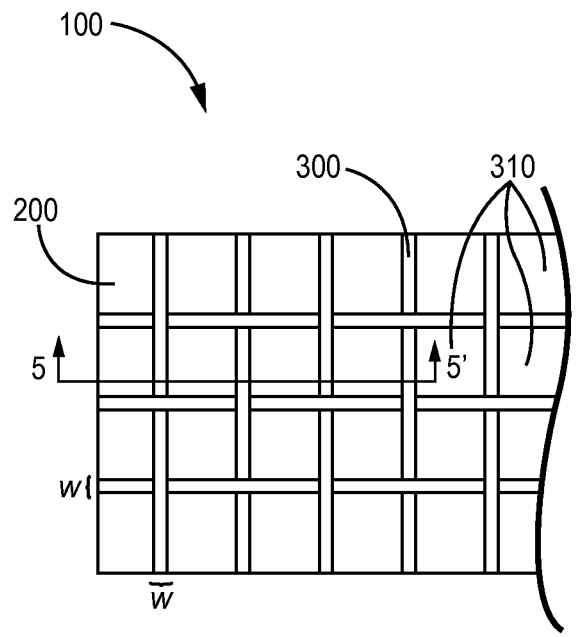
FIG. 4 depicts a schematic facing view of an example microporous membrane laminate consistent with the technology disclosed herein.
Figure 5:
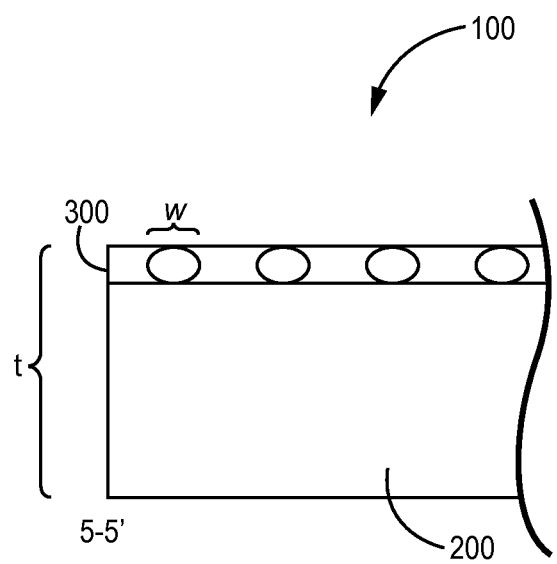
FIG. 5 depicts a schematic cross-sectional view of the microporous membrane laminate consistent with FIG. 4.

The schematics of FIGS. 4-5 provide a more detailed view of a microporous membrane laminate 100 consistent with the technology disclosed herein, where FIG. 4 is a facing view of a portion of a membrane laminate 100 and FIG. 5 is a cross-sectional view of the microporous membrane laminate 100 of FIG. 4. The microporous membrane laminate 100 is generally a microporous membrane layer 200 coupled to a scrim layer 300 to be used in an acoustic venting assembly, such as that depicted in FIG. 1. In some embodiments the microporous membrane layer 200 is directly coupled to the scrim layer 300, where the term "directly coupled" is defined as joined together without intervening substrates. The scrim layer 300 is directly coupled to the microporous membrane layer 200 through calendaring, heat lamination, ultrasonic lamination, adhesive lamination, and the like. As mentioned above, the microporous membrane layer 200 can be a PTFE membrane and the scrim layer 300 can be a thermoplastic woven fiber scrim. The scrim layer 300 and the microporous membrane layer 200 are pressed together at a temperature less than the melting point of the microporous membrane layer 200 and greater than or equal to the melting point of the scrim layer 300.

The microporous membrane layer 200 and the scrim layer 300 are pressed together at a sufficient pressure, temperature, and speed to flatten the scrim layer 300 towards the microporous membrane layer 200. In some embodiments, at least a portion of the material of the scrim layer 300 melts into the pores of the microporous membrane layer 200 at the areas of contact. Generally, the microporous membrane laminate 100 has a thickness t that is a fraction of the sum of the total thickness of the scrim material and the microporous membrane material before lamination. In a variety of embodiments, the thickness t of the microporous membrane laminate 100 is less than 50% of the combined thickness of the un-laminated scrim material and microporous membrane material. In some embodiments, the thickness t of the microporous membrane laminate 100 is less than 30% of the combined thickness of the un-laminated scrim material and microporous membrane material. In at least one embodiment, the thickness t of the microporous membrane laminate 100 is less than 20% of the combined thickness of the un-laminated scrim material and microporous membrane material. Generally, the microporous membrane laminate 100 can have a thickness t between 5 µm and 90 µm. In a variety of embodiments the microporous membrane laminate 100 can have a thickness t between 10 µm and 60 µm. In one particular embodiment, where a microporous membrane material has a thickness of 20.32 µm before lamination and a scrim material has a thickness of 177.8 µm before lamination, the microporous membrane laminate resulting from the lamination of the microporous membrane material and the scrim material has a thickness of 38.1 µm, or 19.2% of the sum of the thicknesses of the microporous membrane material and the scrim material before lamination.

It will be appreciated that a wide variety of temperature and pressure settings associated with lamination can be used to achieve sufficient flattening of the scrim layer 300. In one particular embodiment, a PTFE membrane and a scrim layer are laminated with a nip roller and are subjected to a temperature of about 550° F. and a pressure between 60 and 100 psi at a nip roller speed from 4 ft/min to 12 ft/min. In multiple embodiments consistent with FIGS. 4 and 5, the microporous membrane layer 200 is PTFE, although in other embodiments a different material having pores with diameters of about 2 µm or less could be used. In one embodiment the microporous membrane layer 200 has a thickness from about 10 µm to about 100 µm. In embodiments where PTFE is used as the microporous membrane layer 200, the PTFE has an average pore size between 0.05 µm and 2.0 µm. In a variety of embodiments, the PTFE has a porosity of greater than 10% by volume. In some embodiments, the PTFE has a porosity of greater than 50% by volume. In some embodiments the PTFE is black in color, and preferably can be a composite consistent with the technology described in co-owned, co-pending U.S. patent application Ser. No. 13/839,046, filed on Mar. 15, 2013, which is incorporated by reference.

In most embodiments, the scrim layer 300, and therefore the scrim material that is used to form the scrim layer 300, is generally a layer constructed of woven fibers organized in a lattice framework defining a plurality of discrete scrim openings 310. The lattice structure can have a variety of configurations, such as the grid configuration depicted in FIG. 4, although other formations are contemplated as well.

Prior to lamination, the lattice framework of the scrim material generally has a lattice width w ranging from about 0.002 inches to about 0.01 inches, generally no greater than about 0.008 inches, and in at least one embodiment about 0.006 inches. The term "width" when used to characterize the lattice framework refers to the average distance between abutting scrim openings, as reflected in FIGS. 4 and 5. In some embodiments multiple fibers run adjacently to form the lattice framework of the scrim material. In such embodiments, the combined diameters of those fibers can be an approximation of the width w of the lattice framework, although how tightly such fibers are woven also will contribute to the actual width of the lattice framework.

The scrim material can be constructed of a variety thermoplastic materials that can be laminated to the microporous membrane. As the microporous membrane laminate 100 disclosed herein is directed to acoustic applications, the scrim material for the scrim layer 300 can be chosen based on properties appropriate for acoustic applications such as a reduced likelihood of dampening of an acoustic signal. Non-acoustic properties can also be considered for commercial and production purposes. For example, a non-acoustic property that can be considered is the ease of lamination to the PTFE membrane.

With regard to example properties that may be relevant to acoustic performance, a relatively lower basis weight of the scrim material is generally expected to result in less moving mass when the material is excited by an acoustic signal. In another example, it can be desirable for the scrim material to have high flexibility and/or elasticity to be less resistant to sound pressure waves passing through the material. Thickness, percent open area, and the size of the scrim openings of the scrim material can similarly be relevant to determining if a scrim material will accommodate sound pressure waves. For example, relatively high percent open areas and relatively large scrim openings of the scrim material can suggest a minimal effect on the PTFE membrane for purposes of acoustic transmission. In some embodiments, the scrim material can have a percent open area between 30% and 60%, where the percent open area describes the area of the scrim openings relative to the entire area of the scrim material.

Some properties of the scrim material may suggest poorer acoustic performance according to one metric, but better acoustic performance according to another metric. For example, a relatively high basis weight can indicate that use of the scrim material will result in reduced acoustic transmission, but the relatively high basis weight can also indicate that use of the scrim material will result in reduced harmonic distortion, which will be described in more detail below.

In multiple embodiments, the scrim material is constructed of polyester. Polyester fibers can have relatively small diameters and can be thermally laminated to PTFE. Polyester is also a relatively flexible fabric. High density polyethylene (HDPE) and polypropylene net materials from Delstar, Inc., based in Middletown, Del., also meet some of the above criteria, as well. These materials have a relatively low basis weight, discreet open areas, are very flexible, and are easy to heat laminate as well. Generally the scrim material has a basis weight that is less than about 100 g/m². More particularly, the scrim material can have a basis weight that is less than about 70 g/m². In some embodiments the scrim material has a basis weight that is less than about 40 g/m². In one embodiment, the scrim material has a basis weight of about 27 g/m². Scrim openings of the scrim material can have an average area between 0.20 mm² and 5.0 mm². In one particular embodiment the scrim openings average less than 3 mm².

The lattice structure of the scrim layer 300 and, therefore, the scrim material, is generally configured such that the scrim openings 310 are distributed relatively consistently across the membrane laminate 100 and have relatively consistent sizes. The lattice structure of the scrim layer 300 is configured such that the inner unbonded regions of acoustic venting assemblies (such as element 34 depicted in FIGS. 1-2) each define a plurality of scrim openings 310 to ensure performance consistency across the assemblies. For example, in acoustic venting assemblies having an unbonded region measuring 2.9 mm across, performance inconsistencies across the vent assemblies may arise if the scrim openings 310 measure 3.0 mm across because some assemblies will have fibers laying across the inner unbonded region, and some assemblies will not. In at least one embodiment, the inner unbonded region will have an area that is at least 2.5 times larger than the average area of each scrim opening of the scrim material to ensure a relatively consistent acoustic performance across multiple venting assemblies.

On the other hand, the scrim openings of the scrim material are generally configured to be large enough such that laminating the scrim layer to the microporous membrane layer does not result in a notable increase in the water entry pressure of the microporous membrane laminate relative to the water entry pressure of the microporous membrane alone. No notable increase in water entry pressure can be an indicator that the maximum pore size of the membrane laminate is substantially similar to the maximum pore size of the microporous membrane layer alone. In a variety of embodiments, the water entry pressure of the microporous membrane laminate is greater than 3 psi. In some embodiments, the water entry pressure of the microporous membrane laminate is greater than 4 psi.

The scrim openings of the scrim material are generally large enough such that, after lamination to a microporous membrane, an adhesive laminate sealably engaging the scrim layer 300 can also sealingly engage the microporous membrane layer 200 as well, rather than only engaging the scrim layer 300. In a variety of embodiments consistent with the present disclosure, an adhesive laminate forms a watertight seal with the scrim layer 300 and the microporous membrane layer 200 that is equal to or greater than IPx7, as defined herein. In a variety of embodiments consistent with the present disclosure, an adhesive laminate forms a watertight seal with the scrim layer 300 and the microporous membrane layer 200 that prevents water passing between them when immersed in 1 meter of water for 30 minutes. By "immersed in 1 meter of water", it is meant that the 1-meter depth is measured at the bottom of a device which includes the adhesive laminate, and the water depth is at least 15 cm at the top of the device.

Figure 6:
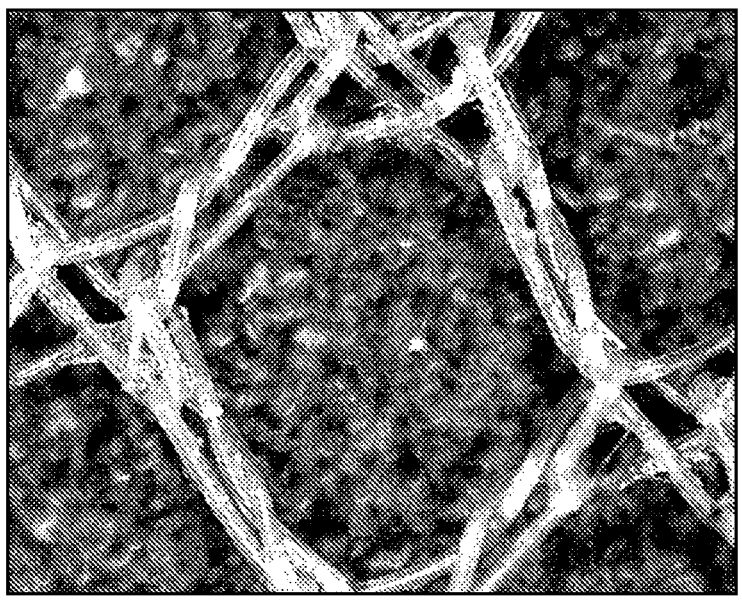
FIG. 6 is a photo of a scrim material before lamination to a PTFE membrane through an optical microscope.
Figure 7:
FIG. 7 is a photo of a scrim layer after lamination of the scrim material of FIG. 6 to a PTFE membrane through an optical microscope.

Generally, the lamination of the scrim layer 300 and the membrane layer can augment the fiber morphology of the scrim layer 300 creating a fiber matrix with improved inter-fiber adhesion. FIGS. 6 and 7 are photographs through an optical microscope of an example scrim layer having a lattice framework defined by three woven fibers before and after lamination. In a variety of embodiments, the lamination of the microporous membrane and the scrim layer flattens the fibers of the scrim layer and melts them together. In such embodiments, the average size of the scrim openings 310 decrease after lamination of the scrim layer 300 to the microporous membrane layer 200, and the width w of the lattice framework increases after lamination of the scrim layer 300 to the microporous membrane layer 200. As such, the percent open area of the scrim layer 300 is reduced compared to the percent open area of the scrim material before lamination. In a variety of embodiments, the scrim layer 300 after lamination has scrim openings that are at least a 5% smaller than the openings in the scrim material before lamination. In at least one embodiment, the scrim layer 300 after lamination defines scrim openings 310 that are 8% and even 12% smaller than the scrim openings defined by the scrim material before lamination. In at least one embodiment, at least some of the material forming the scrim layer 300 is displaced into pores of the microporous membrane layer 200 at the points of contact between them.

The technology disclosed herein can be used in acoustic vent assemblies having a wide range of sizes and shapes. In some embodiments, the inner unbonded region of the microporous laminate in a vent assembly can have an area ranging from 1 mm² to 1000 mm². In one particular embodiment, the vent assembly has an inner unbonded region of about 20.2 mm².

Testing of a variety of types of microporous membrane laminates was conducted to predict acoustic transmission performance through transmission loss testing. Frequency response/insertion loss testing was also conducted to determine the actual acoustic transmission performance of the assembled venting assembly. Transmission loss testing has typically been used in the art to predict acoustic transmission performance but, as will be demonstrated herein, transmission loss testing can have less predictive value for small, finished parts that are not a standard size and/or are not made of a PTFE-only membrane or fabric.

Transmission Loss of Membrane Laminates

Figure 8:
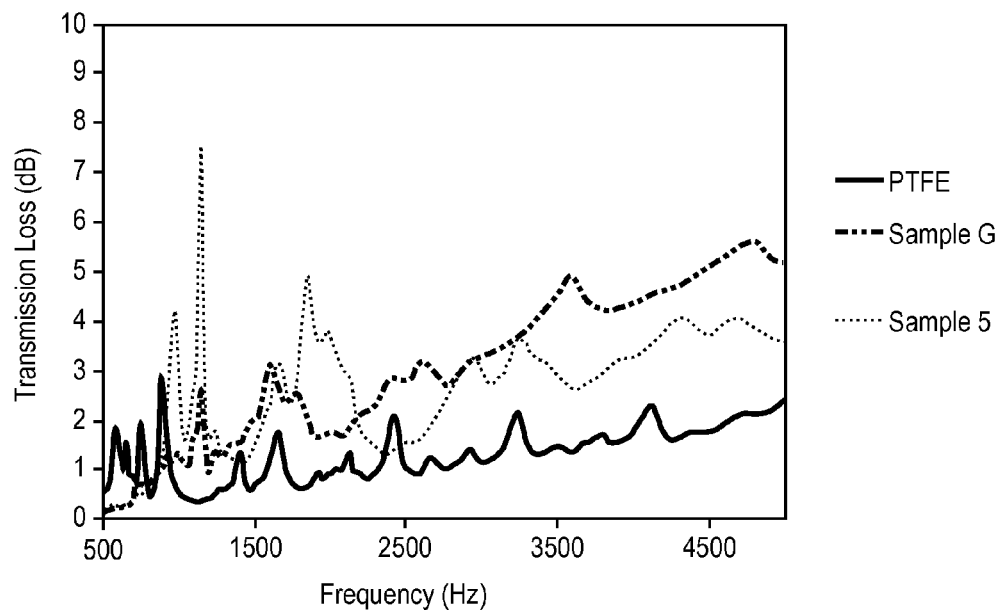
FIG. 8 depicts the example transmission loss testing results of membranes consistent with the technology disclosed herein compared to a PTFE-only membrane.

The transmission loss test is designed to measure the acoustic impedance of a flat sheet of material at a standard size, and is typically used to predict the acoustic transmission of acoustic vent assemblies. Transmission loss tests were performed on a number of microporous membranes, some of which were constructed consistently with the technology disclosed herein. Testing guidelines established by ASTM E2611-09 were used with 37 mm diameter membrane samples mounted in a 37 mm tube. FIG. 8 displays the graphical transmission loss data for a PTFE membrane and two membrane laminates consistent with the technology disclosed herein in the 500 Hz to 5000 Hz frequency range. Sample 5 is a PTFE membrane laminate where the support scrim layer is an ultra-light, diagonal weave, polyester support scrim having a triple thread such as 20 Tulle supplied by Dodenhoff Industrial Textiles (based in Westlake, Ohio) (as the scrim depicted in FIGS. 6 and 7, previously discussed). Sample G is a PTFE membrane laminate where the support scrim is a high density polyethylene (HDPE) and ethylene vinyl acetate (EVA) having a relatively tight weave, such as X540NAT-E/E Delnet® from DelStar Technologies (based in Middletown, Del.). As visible in FIG. 8, the responses of materials tested are erratic, containing spikes and humps at various frequencies and frequency ranges. A spike or hump indicates that the vent is resistant to vibrations around particular frequencies. Over this frequency range PTFE shows better performance than the other two laminates.

Figure 9:
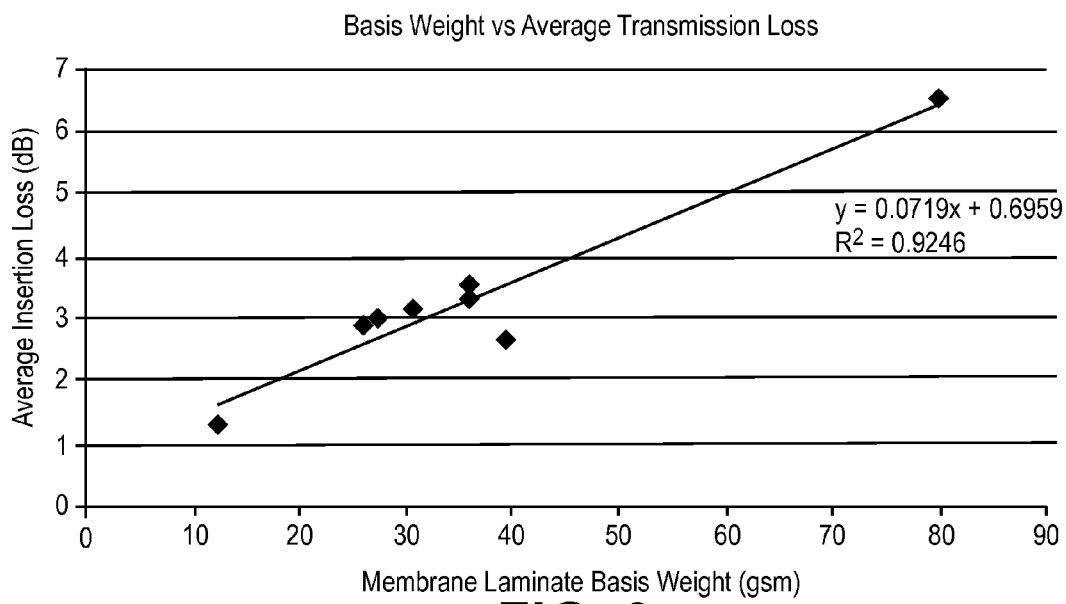
FIG. 9 is a plot of the average transmission loss results compared to basis weight.

Table 1 below displays the transmission loss data for each of the material samples tested and the basis weight of the sample, including samples that were omitted from the graph of FIG. 8 for clarity. Membrane #0 is the control, which is an acoustic grade PTFE-only membrane. FIG. 9 is a plot graph depicting the relationship between basis weight of a material and the average transmission loss. FIG. 9 demonstrates that as the basis weight of the media increases, the transmission loss also increases.

TABLE 1

Transmission Loss (500-5000 Hz)

| Label # | Basis Weight (g/m²) | Average dB | St Dev | Min dB | Max dB |
|---|---|---|---|---|---|
| 0 | 12.2 | 1.26 | 0.56 | 0.17 | 2.84 |
| 5 | 39.3 | 2.67 | 1.15 | 0.23 | 7.54 |
| C | 26.2 | 2.89 | 1.42 | 0.31 | 5.31 |
| D | 27.2 | 2.99 | 1.43 | 0.35 | 5.44 |
| G | 30.8 | 3.13 | 1.46 | 0.53 | 5.59 |
| 6 | 35.9 | 3.30 | 1.29 | 0.41 | 8.73 |
| E | 35.9 | 3.51 | 1.73 | 0.34 | 6.44 |
| 4 | 80.0 | 6.50 | 2.74 | 0.38 | 13.90 |

Transmission loss tests are generally used to predict the acoustic transmission of acoustic vents in product form, which can be much smaller than the sample membrane that is tested for transmission loss. While the results of transmission loss testing do reflect some general tendencies of vent materials, the humps and spikes in the data is excluded to predict how a sample might perform when converted to a very small part. Small pieces of material do not have the same dynamic acoustic response as a large sample of material; rather, their responses are much less complex. Using transmission loss testing alone, one would not expect the acoustic performance of a PTFE laminate to be consistent with PTFE-only constructions. Frequency response and insertion loss testing as described below can be used to more accurately ascertain the actual acoustic performance of an acoustic vent in product configurations.

H1 Frequency Response and Insertion Loss Description

In general, frequency response is a quantitative measure of the output spectrum of a system or device in response to stimulus. It is a measure of the magnitude and phase of the output as a function of the frequency, in comparison to the input. In the context of an acoustic vent, the frequency response function (FRF) is a measure of the magnitude and phase of acoustic waves that have passed through the acoustic vent in comparison to the acoustic waves before they pass through the acoustic vent at each frequency across a particular acoustic range.

Unlike transmission loss, discussed above, the frequency response and insertion loss are measures associated with the acoustic vent in its configuration for use, which can be particularly useful when the acoustic vent is much smaller than the standard sizes that can be tested in a transmission loss test. Furthermore, frequency response and insertion loss testing can determine measures consistent with how the acoustic vent can be used. As an example, an acoustic vent can be tested as a microphone vent to determine performance in microphone applications, and the acoustic vent can be tested as a speaker vent to determine performance in speaker applications.

Microphone Vent Testing

In one example of an experimental test for the H1 frequency response function of an acoustic-vent-of-interest, random acoustic signals, such as white noise, are generated via a loudspeaker inside an anechoic test chamber. Two microphones are installed in the chamber to measure the acoustic signal, a reference microphone and an output microphone. Each of the microphones has a cap installed over the active area of the microphone, and the cap of the output microphone has the acoustic-vent-of-interest installed on the cap. The cap installed over the reference microphone lacks an acoustic vent. As such, the acoustic signals received through the reference microphone, which does not pass through any acoustic vent, is interpreted as equivalent to the acoustic signal prior to passing through the acoustic-vent-of-interest, and is accordingly designated the input data, or reference data, by the processing software. The acoustic signals received through the output microphone, which did pass through the acoustic-vent-of-interest, are designated as output data. The acoustic signals from the two microphones are then compared by the software to generate an H1 FRF across the spectrum.

Figure 10:
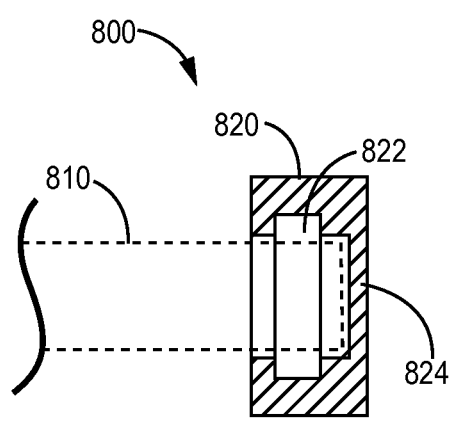
FIG. 10 depicts a cross-sectional view of a test cap consistent with experimental testing described herein.

FIG. 10 depicts a cross-sectional view of an example test cap 800, installed over a first microphone 810. An O-ring is disposed in an opening 822 defined by the cap 800, which creates a seal between the cap 800 and the first microphone 810. Although not depicted in the current figure, an opening is machined in the axial center of the back wall 824 of the cap 800 to match the size and shape of the vent being tested, where the vent is installed similarly to how the vent would be installed over the opening defined by an electronics housing, as described above with reference to FIGS. 1-3. Generally, the machined opening will match the size and shape of the unbonded inner region portion of the acoustic-vent-of-interest, such as described above with respect to FIGS. 1-3, and the second test cap associated with the second microphone will have a substantially identical opening machined therein.

Consistent with the experimental set up described above, one analysis system that can be used is the PULSE Analyzer Platform by Brüel & Kjær Sound & Vibration Measurement A/S (located in Nærum, Denmark). The speaker is powered by the PULSE Analyzer Platform software to produce white noise. Brüel & Kjær type 2670 microphones can be used with the PULSE Analyzer Platform to administer this test. The PULSE Analyzer Platform software records microphone data for 5 seconds and averages the result across the frequency range. Acoustic data from the reference microphone is compared to the acoustic data from the output microphone by the PULSE Analyzer Platform software using the H1 FRF (frequency response function) calculation method which provides an output value in decibels (dB) at intervals across a frequency range. The lower the frequency response is for an acoustic vent in decibels, the better the sound transmission through the vent.

Figure 11:
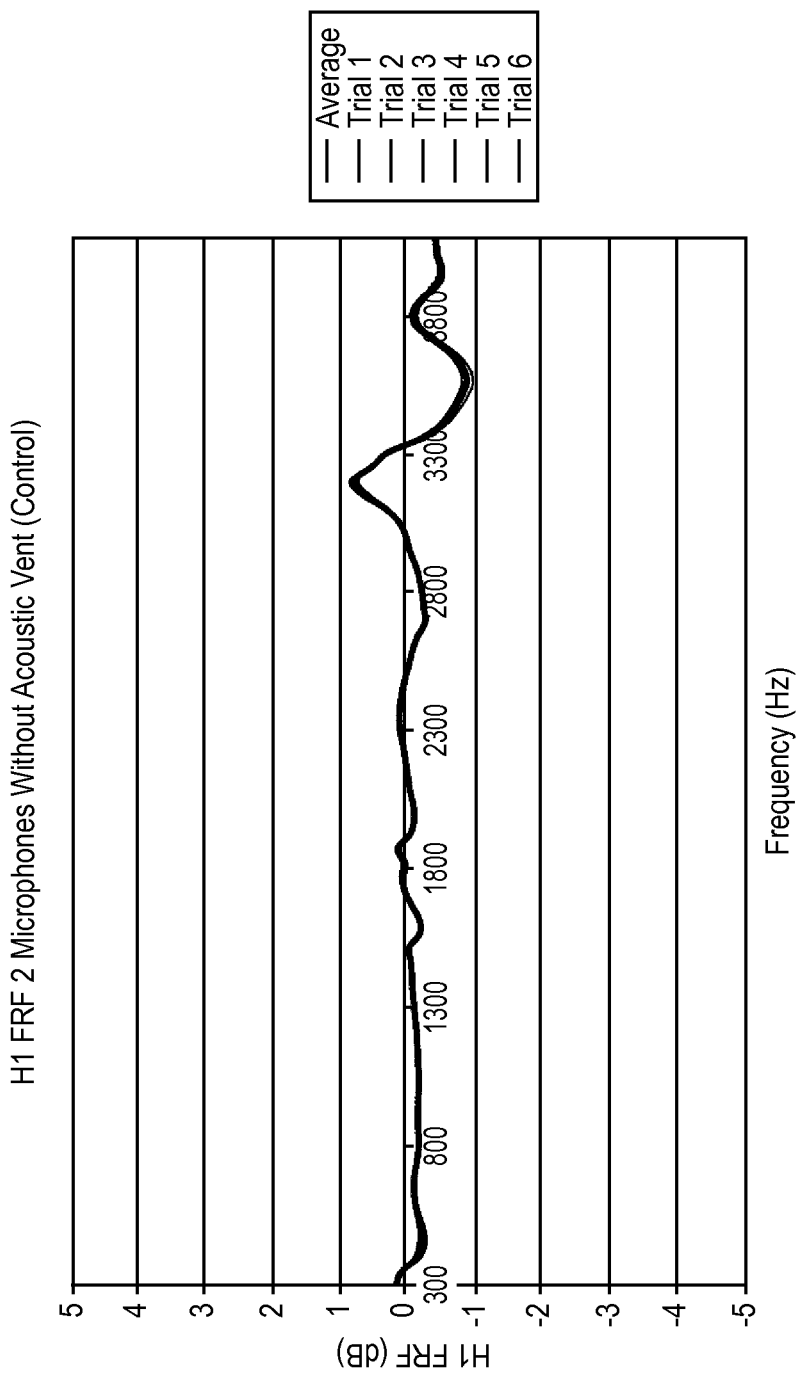
FIG. 11 is a graph depicting results for example control tests for frequency response.

The H1 FRF calculation primarily demonstrates a loss in acoustic signal that is attributed to the acoustic vent. However, a small portion of the loss in acoustic signal is due to equipment imperfections between the two microphones, their positioning, and the sound field generated by the speaker. As such, it can be desirable to also run a control test to generate the H1 FRF control curve. Such an FRF control test has a similar test set-up as described above with regard to testing an acoustic-vent-of-interest, except each cap associated with the reference microphone and the output microphone lacks an acoustic vent. The H1 FRF calculation results are attributed to imperfections in the test setup. As such, in a perfect test, the H1 FRF will result in 0 dB across the spectrum. FIG. 11 depicts results associated with example control tests using the test equipment described above.

To calculate insertion loss, the control H1 FRF results adjust the test H1 FRF calculation results through the following equation:

$$IL(f) = H1_{vent}(f) - H1_{control}(f),$$

where IL(f) is the insertion loss; $H1_{vent}(f)$ is the H1 FRF for the acoustic-vent-of-interest; and $H1_{control}(f)$ is the H1 FRF for the control setup described above.

It will be appreciated by those having skill in the art that with a perfect, or near perfect, experimental setup the insertion loss will be numerically equivalent, or near equivalent, to the H1 FRF for an acoustic-vent-of-interest. But in practice, equipment quality can vary and therefore it is common to use insertion loss when determining the effect of a component on an acoustic signal. In this particular test procedure, the insertion loss is a comparison of FRF between microphones with and without an acoustic vent covering the output signal microphone.

As will be appreciated, the insertion loss results can be complex in nature. When attempting to compare the results of two different materials tested in an identical manner, it can be useful to calculate the average insertion loss in dB over a particular frequency range of interest. This is referred to as the average insertion loss. An equation for this calculation is given below:

$$IL_{avg} = \frac{1}{5000 - 500} \int_{500\,Hz}^{5000\,Hz} IL(f)\,df,$$

where IL(f) is the value of the insertion loss function at a given frequency f, and the frequency range is from 500 Hz to 5000 Hz. Where the average insertion loss in an alternate frequency range is desired, the integral is calculated over that frequency range and then divided by the difference between the maximum frequency and the minimum frequency in that range, as will be appreciated by those having skill in the art.

Insertion Loss Testing of Microphone Vent Assemblies—Membrane Comparison

Various microphone vent assemblies having different microporous membranes were tested for insertion loss, including some microphone venting assemblies constructed consistently with the technology disclosed herein. The microporous membranes tested in the microphone venting assemblies were consistent with those subjected to transmission loss testing, discussed above.

Figure 12:
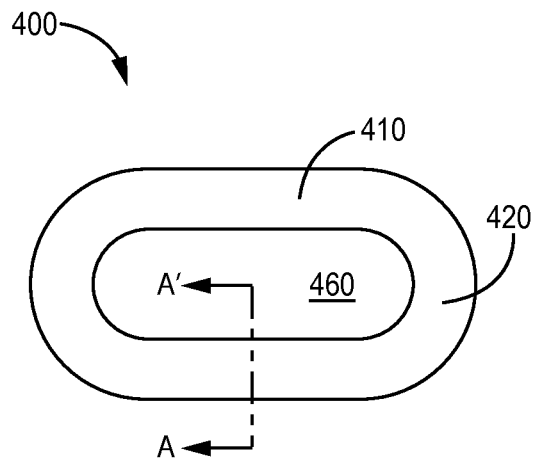
FIG. 12 depicts a facing view of another example acoustic venting assembly consistent with the technology disclosed herein.
Figure 13:
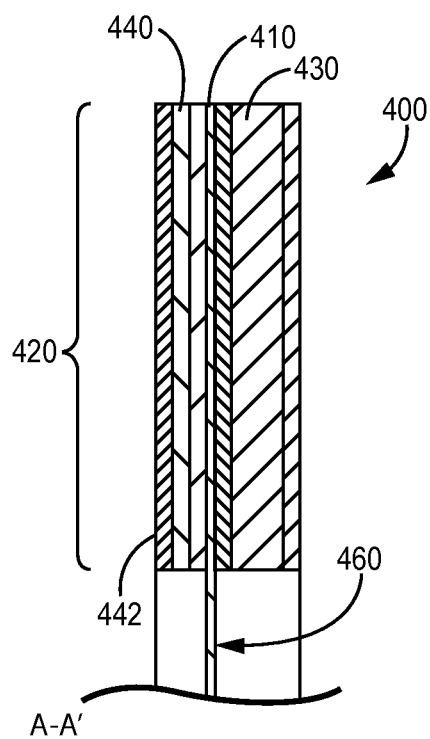
FIG. 13 depicts a cross-sectional view of the acoustic venting assembly of FIG. 12.

The vent assemblies were constructed consistently with the example vent assembly depicted in FIGS. 12-13, where FIG. 13 is a cross-sectional view of the component depicted in FIG. 12. Each vent assembly 400 had a PTFE membrane or membrane laminate 410 having an oval shape with a length of 10.58 mm, a width of 5.9 mm, and a perimeter bonded region 420 having a width of 1.5 mm surrounding an inner unbonded region 460. The perimeter bonded region 420 was bonded to a foam laminate single-sided adhesive 430 on one side of the membrane 410 and a polyester film double-sided adhesive 440 on the other, opposite side of the membrane 410. The polyester film double-sided adhesive 440 was a pressure-sensitive adhesive. As a result of manufacturing, in a variety of embodiments the otherwise-exposed outer adhesive surface 442 of the polyester film double-sided adhesive 440 can be coupled to a continuous release liner from which is removed for use. Such a continuous release liner can also be coupled to a plurality of substantially identical vent assemblies. In an alternate embodiment, the foam laminate is a double-sided adhesive, where the otherwise-exposed adhesive surface of the foam laminate double-sided adhesive is coupled to a release liner.

Two test caps, such as described above with respect to FIG. 10, were machined to define openings matching the size and shape of the inner unbonded inner region 460 of the vent assembly 400. The pressure-sensitive double-sided adhesive 440 was coupled to one of the test caps around the machined opening such that the inner unbonded region 460 aligned with the machined opening.

Figure 14:
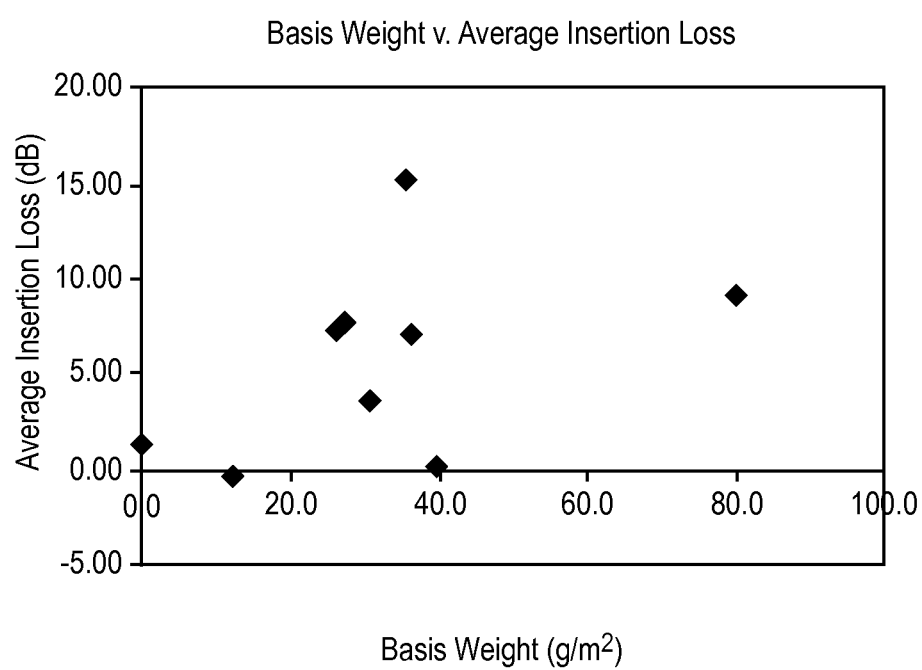
FIG. 14 is a plot of the average insertion loss results compared to basis weight of each of the microporous membranes used in the tested venting assemblies.

The vent assemblies 400 were tested according to the frequency response/insertion loss testing method described above. Table 2 below shows comparisons between basis weight and average insertion loss in the 500-5000 Hz frequency range which is plotted in the graph depicted in FIG. 14. As demonstrated by FIG. 14, there appears to be a weak correlation between basis weight of an acoustic membrane/membrane laminate and its insertion loss, indicating that basis weight is not necessarily a strong predictor of the actual acoustic performance of an acoustic vent.

TABLE 2

Insertion Loss (500-5000 Hz)

| Label # | Basis Weight (g/m$^2$) | Average dB | St Dev | Min dB | Max dB |
|---|---|---|---|---|---|
| 0 | 12.2 | −0.48 | 2.06 | −4.58 | 1.84 |
| 5 | 39.3 | 1.65 | 1.86 | −1.81 | 3.58 |
| C | 26.2 | 7.38 | 1.95 | 2.00 | 9.26 |
| D | 27.2 | 7.63 | 1.55 | 3.54 | 9.12 |
| G | 30.8 | 3.51 | 3.40 | −6.02 | 6.55 |
| 6 | 35.9 | 7.09 | 3.41 | −2.95 | 13.80 |

TABLE 2-continued

Insertion Loss (500-5000 Hz)

| Label # | Basis Weight (g/m²) | Average dB | St Dev | Min dB | Max dB |
|---|---|---|---|---|---|
| E | 35.9 | 15.35 | 0.39 | 13.72 | 15.94 |
| 4 | 80.0 | 9.32 | 2.13 | 4.18 | 13.12 |

Insertion Loss Testing of Microphone Vent Assemblies—Size Comparison

Figure 15:
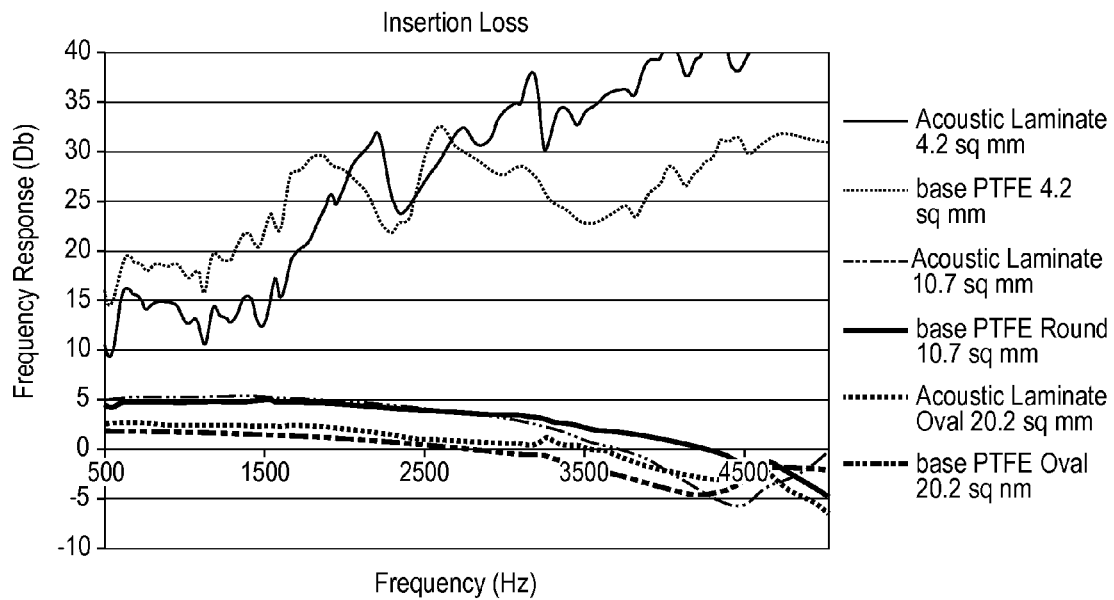
FIG. 15 is a graph of the insertion loss of PTFE membranes and membrane laminates in differently-sized venting assemblies.
Figure 16:
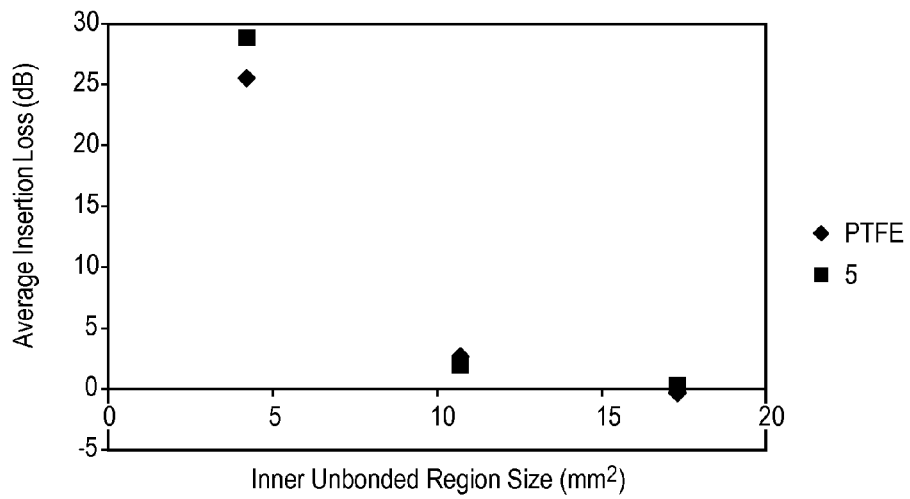
FIG. 16 is a plot of the average insertion loss compared to venting assembly size.

The size of the vent assembly tested for insertion loss has a significant result on the performance. Microphone vent assemblies having PTFE-only membranes and PTFE membrane laminates (with polyester scrim) were tested to compare the effect of the size of the inner unbonded regions on acoustic transmission. The data associated with "5" is consistent with Sample 5, discussed above, and the data associated with membrane "0" is the control acoustic grade PTFE-only membrane, also discussed above. Graphical results are depicted in FIG. 15, and the average insertion loss results compared the size of the inner unbonded region size is reported in Table 3, below, which is also plotted in FIG. 16. As demonstrated, as the size of the unbonded region decreases, the insertion loss of the material increases considerably.

TABLE 3

Average insertion loss data for different sized SBFs
Insertion Loss (500-5000 Hz)

| Label # | SBF Size | Average dB | St Dev | Min dB | Max dB |
|---|---|---|---|---|---|
| 0 | Oval 20.2 mm² | −0.33 | 2.32 | −5.54 | 2.12 |
| 0 | Circle 10.7 mm² | 2.67 | 2.43 | −4.37 | 4.97 |
| 0 | Circle 4.2 mm² | 25.53 | 4.63 | 14.61 | 32.49 |
| 5 | Oval 20.2 mm² | 0.31 | 2.24 | −5.96 | 2.69 |
| 5 | Circle 10.7 mm² | 1.97 | 5.28 | −5.72 | 5.28 |
| 5 | Circle 4.2 mm² | 28.86 | 10.51 | 9.70 | 44.21 |

As demonstrated, the acoustic transmission of a microporous laminate in a microphone vent is dependent on a complex set of characteristics and does not exhibit high correlation with basis weight, as compared to transmission loss testing, which does appear to correlate strongly with basis weight. Since transmission loss testing is conducted at a standard size, to extrapolation of the transmission loss data to predict the acoustic transmission of a much smaller vent assembly. While the transmission loss data discussed above demonstrates that transmission loss testing may accurately predict the relative acoustic transmission of PTFE-only, but it cannot accurately predict the acoustic transmission of a microporous membrane laminate with a support scrim.

Speaker Vent Testing

As described above, frequency response and insertion loss can reflect the performance consistent with how an acoustic vent will be used. While the experimental set-up and results described above were particularly relevant to acoustic vents covering a microphone, testing was also conducted for acoustic vents covering a speaker. Acoustic vents covering speakers are subject to different conditions than acoustic vents covering microphones. For example, acoustic vents covering speakers can be subject to much higher energy than acoustic vents covering a microphone. As such, frequency response and insertion loss measurements are expected to be different depending on how the acoustic vent is being used.

Some similar equipment was used as in the microphone vent frequency response and insertion loss testing described above, but the test setup was modified. In speaker vent testing, the acoustic vent was positioned immediately adjacent to the speaker. The 6-inch loudspeaker used for testing the microphone vents was replaced with a small speaker that corresponds with the size of small speakers in personal electronic devices, such as cell phones, to make the test set-up consistent with how speaker vents could be used. A speaker plate was disposed over the speaker that had a machined opening to match the size of the speaker. In the test, the speaker and the machined opening in the speaker plate had an ovular shape that is about 7.5 mm in length and about 3 mm in width.

Each acoustic vent tested as a speaker vent was consistent with the embodiment described above (and depicted in FIG. 12) and was positioned over the opening in the speaker plate similar to how the acoustic vents were positioned over the test cap, described above. As such, the acoustic vent was positioned about 1.0 mm away from the speaker. In the test set-up, a single microphone was used that was positioned directly facing the speaker approximately 1.0 cm away. The speaker and the microphone are separately mounted on rigid support structures within an anechoic test chamber.

It is noted that the measurements collected can be highly dependent on the specific equipment and settings used. As such, for purposes of this document, speaker vent insertion loss is determined by the testing protocols specified herein. For testing as described herein, the Knowles 2403 260 00041 (4.8×10×2.2 mm) speaker was used. The microphone used was a Brüel & Kjær model 2238-B Microphone and Sound Level Meter. The analysis system used was the Audio Real Time Analysis (ARTA) Software by Artalabs (located in Kaštel Lukšić, Croatia) and the test that was run was the FR2 test. The speaker was powered by the ARTA software to produce white noise, and the volume was set such that the microphone recorded 89 dB(A) average from the speaker without a speaker vent. The ARTA software records microphone data and averages the result across the frequency range.

Data is collected and processed similarly to as described above for the microphone vent testing except that, to complete the test, data is collected twice with the same amount of power provided to the speaker: once with no acoustic vent positioned in the speaker plate that is designated as the input data, or reference data, and once with the acoustic-vent-of-interest disposed in the speaker plate, which is designated as output data. The input data and the output data are compared to generate the frequency response across the spectrum. Since the input data and the output data are collected in different runs and the frequency response of the acoustic vent is a comparison of the input data to the output data, no H1 FRF control curve (see the microphone vent test, described above) is necessary to account for imperfections in the test setup. As such, the insertion loss of the speaker vent in this test is equal to the frequency response of the speaker vent.

Figure 17:
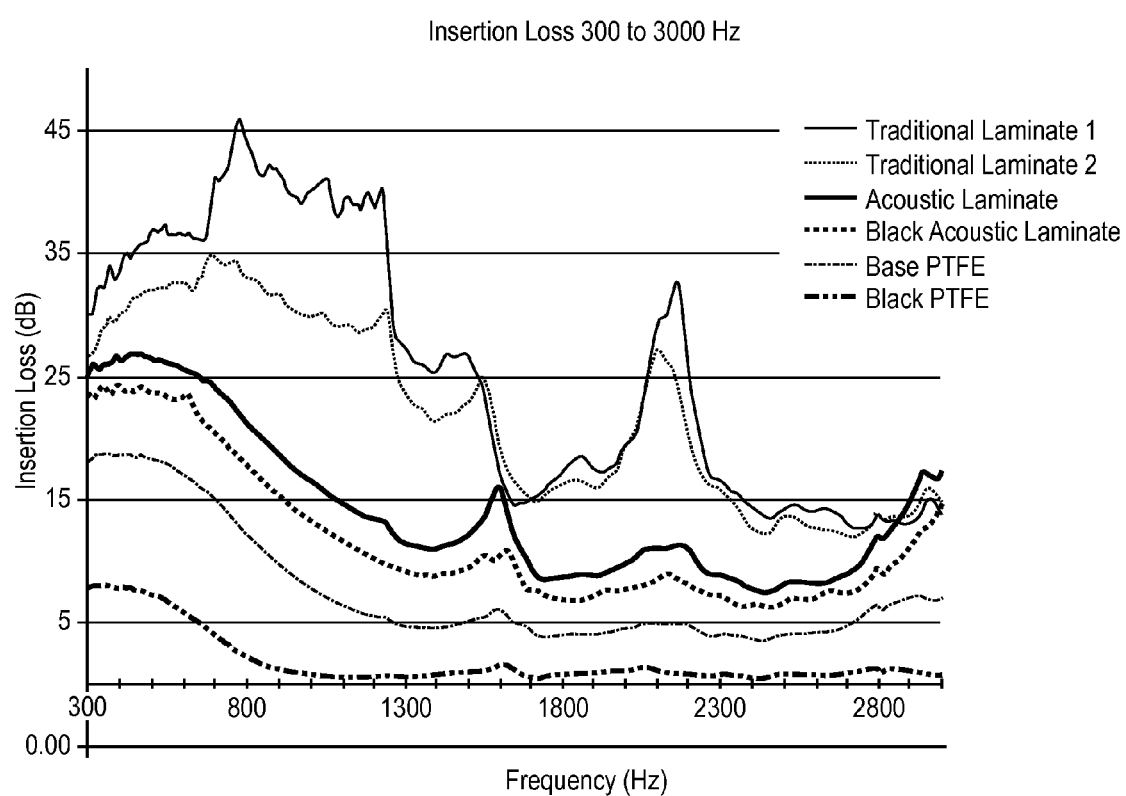
FIG. 17 is a graph depicting the insertion losses of acoustic venting assemblies over the 300 Hz to 3500 Hz frequency range.

FIG. 17 depicts the average insertion loss testing results for speaker vents having laminates consistent with the technology disclosed herein compared to traditional membrane laminates and PTFE-only membranes over the frequency range 300 Hz to 3000 Hz. The vent assemblies were constructed consistently with the example vent assembly depicted in FIGS. 12-13 and described above. The "Traditional Laminate 1" is a nonwoven polyethylene terephthalate layer (PET) gravure laminated to a PTFE membrane. "Traditional Laminate 2" is a nonwoven PET layer heat laminated to a PTFE membrane. The "Base PTFE" is a white microporous PTFE membrane, and the "Black PTFE" is a PTFE membrane that is processed consistently with the technology disclosed in co-pending U.S. patent application Ser. No. 13/839,046 (discussed above) to be black in color. The "Acoustic Laminate" is microporous membrane laminate consistent with the technology disclosed herein where the scrim layer is the 20 Tulle scrim, described earlier, that is heat laminated and pressed into a base PTFE membrane layer. The "Black Acoustic Laminate" is a microporous membrane laminate consistent with the technology disclosed herein, where the scrim layer is the 20 Tulle scrim that is heat laminated and pressed into a black PTFE membrane layer consistent with the "Black PTFE."

FIG. 17 demonstrates the improved acoustic transmission of speaker vents having the microporous membrane laminates disclosed herein compared to traditional laminates, and the slightly reduced acoustic transmission of the microporous membrane laminates disclosed herein compared to PTFE-only membranes. Table 4, below, depicts the average insertion loss for each of the membranes across the 300-3000 Hz frequency range, as depicted in FIG. 17.

TABLE 4

Insertion Loss (300-3000 Hz)

| Membrane | Average dB |
| --- | --- |
| Traditional Laminate 1 | 23 |
| Traditional Laminate 2 | 21 |
| Acoustic Laminate | 14 |
| Black Acoustic Laminate | 12 |
| Base PTFE | 7 |
| Black PTFE | 2 |

Some of the microporous membrane laminates consistent with the technology disclosed herein are particularly suited for use in speaker vent assemblies, although some other embodiments of the microporous membrane laminates are particularly suited for use in microphone vent assemblies. The acoustic venting assemblies having microporous membrane laminates consistent with the technology disclosed herein generally exhibit increased average insertion loss compared to an acoustic venting assembly incorporating only the microporous membrane itself. In some embodiments the average insertion loss of an acoustic venting assembly having a microporous membrane can be at least double the average insertion loss of a venting assembly having a PTFE-only membrane. In many implementations, however, the increased insertion loss is tolerable when balanced with other improvements. For example, the venting assemblies consistent with the technology disclosed herein have a number of advantages over a PTFE-only venting assembly such as decreased harmonic distortion, and improved handling and strength.

Figure 18:
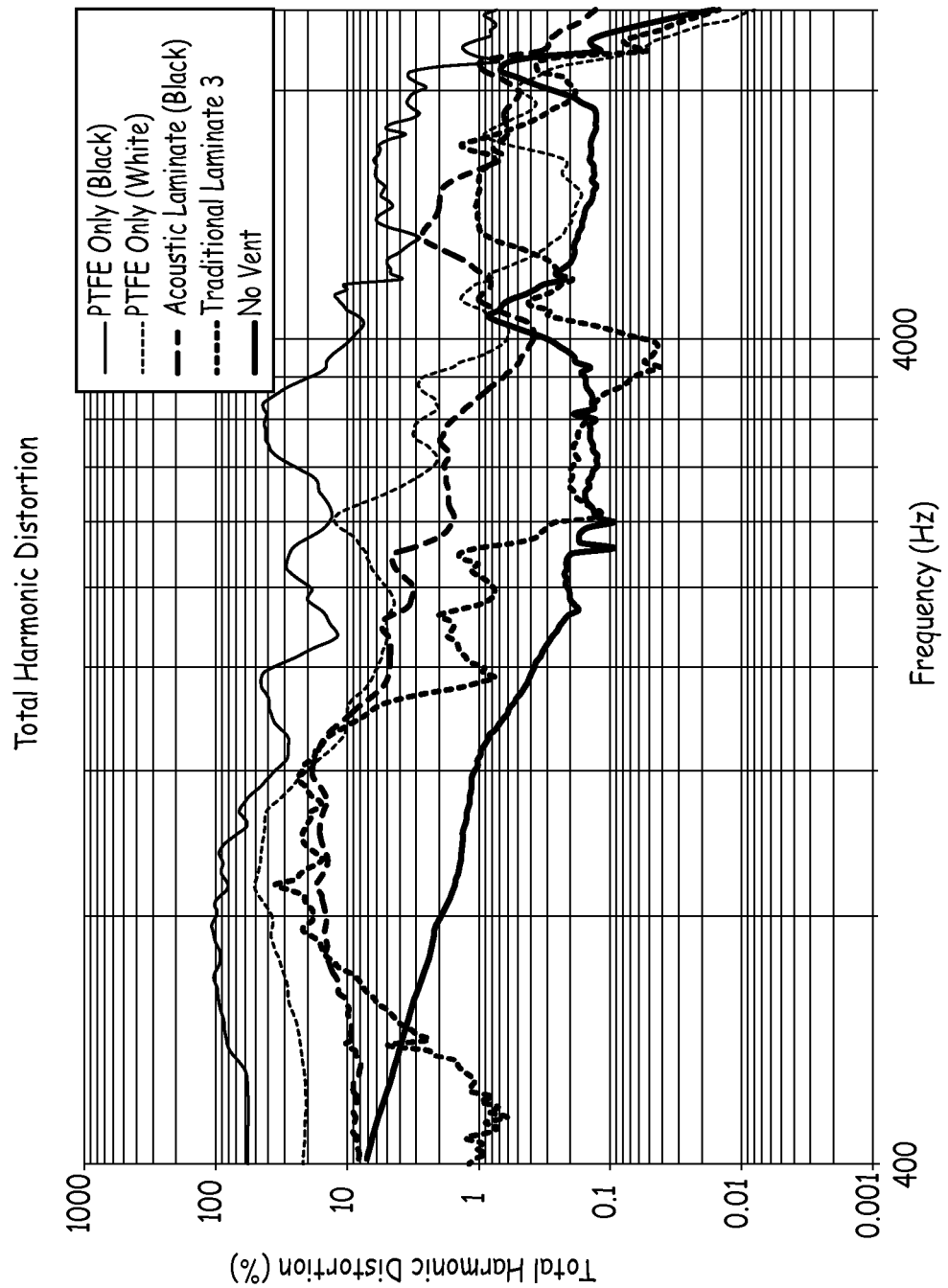
FIG. 18 is a graph of the total harmonic distortion for a variety of venting assemblies.

FIG. 18 depicts the total harmonic distortion for the black acoustic membrane laminate consistent with the technology disclosed herein (discussed above) compared to PTFE-only membranes and a traditional laminate that is a nonwoven PET heat laminated to a PTFE membrane. FIG. 18 demonstrates reduced total harmonic distortion of the acoustic membrane laminates compared to the PTFE-only membranes. Similar to the speaker vent insertion loss measurements, described above, total harmonic distortion is dependent on the particular test set-up that is used. As such, for purposes of the present disclosure, total harmonic distortion is defined by the test protocols specified herein.

Total harmonic distortion was determined using STEPS software by Artalabs (located in Kaštel Lukšić, Croatia) using the test set-up and components consistent with the speaker vent insertion loss testing, described above. The data for total harmonic distortion was collected by stepping through the frequency range one frequency at a time. The total harmonic distortion was calculated by comparing the total power of all of the harmonics frequencies ($2^{nd}$, $3^{rd}$, $4^{th}$ . . . ) relative to the power of the fundamental frequency, that is total harmonic distortion=$(P_2+P_3+P_4 \ldots P\infty)/P_1$. The total harmonic distortion of the speaker was measured without the vent as a reference. The speaker volume was set such that the microphone recorded 80 dB at 1000 Hz from the speaker without a speaker vent.

Figure 19:
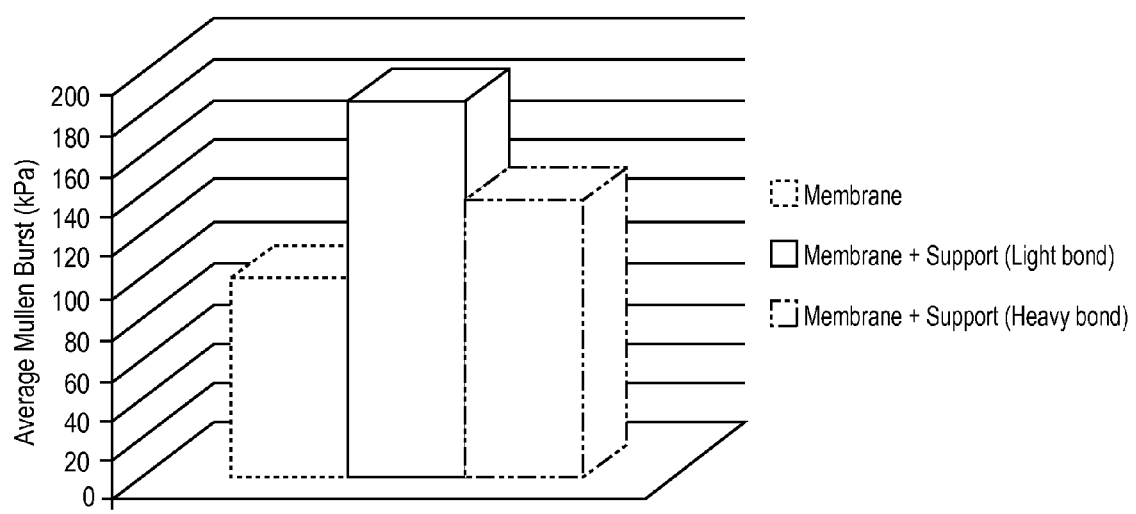
FIG. 19 is a graph of the burst strength of a PTFE-only microporous membrane compared to the burst strengths of microporous membrane laminates consistent with the technology disclosed herein.

FIG. 19 is a graph of the burst strength of a PTFE-only membrane compared to the burst strength of two microporous membrane laminates, one of which is consistent with the technology disclosed herein. The burst strength was determined consistently with the TAPPI T403 standard. Each of the membrane laminates was made with Tulle 20 scrim, as described above, that was laminated to a PTFE membrane. Both laminates were laminated at 550° F. by passing through a nip roller, but the "heavy bond" laminate, which is consistent with the current technology, was passed through the nip roller at a speed of 4 ft/min and pressed to be nearly flush with the PTFE surface. The "light bond" laminate, on the other hand, was passed through the nip roller at 15 feet/min with less pressure so that the scrim was merely surface bonded to the PTFE membrane rather than flattened. As is demonstrated in FIG. 19, the microporous membrane laminate consistent with the technology disclosed herein demonstrated greater strength than the PTFE-only membrane, and less strength than the lightly-bonded laminate.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged", and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

We claim:

1. A method for manufacturing an acoustic venting assembly comprising: providing a PTFE membrane having a first side, a second side, a particular water entry pressure and a thickness between 5 µm and 90 µm; and laminating a scrim layer to the first side of the PTFE membrane to form a membrane laminate for use in an electronics enclosure; wherein the membrane laminate has an outer perimeter and the scrim layer of the membrane laminate comprises fibers melted together and the PTFE membrane of the membrane laminate defines pores containing material of the scrim layer; wherein the membrane laminate has a minimum water entry pressure of about 3 psi, wherein the thickness of the membrane laminate is less than 30% of the total thickness of the scrim layer and PTFE membrane before lamination;

applying a first adhesive to the scrim layer and the first side of the PTFE membrane in a perimeter region of the membrane laminate to form a water tight seal that prevents water passing between the PTFE membrane and the scrim layer when immersed in 1 meter of water for 30 minutes; and applying a second adhesive to the second side of the PTFE membrane in the perimeter region of the membrane laminate to form a water tight seal between the second adhesive and the with the acoustic laminate, wherein the first adhesive and the second adhesive cooperatively define an unbonded region of the membrane laminate.

2. The method of claim 1, wherein laminating the scrim layer comprises ultrasonic lamination.

3. The method of claim 1, wherein laminating the scrim layer comprises adhesive lamination.

4. The method of claim 1, wherein the acoustic laminate exhibits an average speaker vent insertion loss between 10 dB and 16 dB when measured over an unbonded region of about 20.2 mm$^2$ over the frequency range from 300 to 3000 Hz.

5. The method of claim 1, wherein the water entry pressure of the acoustic laminate is greater than 4 psi.

6. The method of claim 1, wherein the PTFE membrane is a composite.

7. The method of claim 1, wherein the PTFE membrane is black.

8. An acoustic vent, comprising:
a PTFE membrane having a first side and a second side;
a scrim layer laminated to the first side of the PTFE membrane forming an acoustic membrane laminate having an outer perimeter and a minimum water entry pressure of about 3 psi, wherein the scrim layer comprises fibers melted together and the PTFE membrane defines pores containing material of the scrim layer;
a first adhesive coupled to the first side of the PTFE membrane and the scrim layer in a perimeter region of the membrane laminate, wherein the first adhesive establishes a water-tight seal that prevents water passing between the PTFE membrane and the scrim layer when immersed in 1 meter of water for 30 minutes; and
a second adhesive coupled to the second side of the PTFE membrane in the perimeter region of the membrane laminate, wherein the second adhesive establishes a water-tight seal with the membrane laminate, wherein the first adhesive and the second adhesive cooperatively define an unbonded region of the membrane laminate.

9. The acoustic vent of claim 8, wherein the unbonded region of the scrim layer defines at least 2.5 scrim openings.

10. The acoustic vent of claim 8, wherein the laminated scrim layer has scrim openings that are at least 5% smaller than the un-laminated scrim layer.

11. The acoustic vent of claim 8, wherein the scrim layer and the PTFE are sealable to a pressure-sensitive adhesive laminate to form a water-tight seal that prevents water passing between the acoustic membrane laminate and the adhesive laminate when immersed in 1 meter of water for 30 minutes.

12. The acoustic vent of claim 8, wherein the water entry pressure of the acoustic membrane laminate is greater than 4 psi.

13. The acoustic vent of claim 8, wherein the first adhesive and the second adhesive have outer perimeters with different shapes.

14. The acoustic vent of claim 8, wherein the first adhesive and the second adhesive cooperatively define two or more unbonded regions of the membrane laminate.

15. The acoustic vent of claim 8, wherein one of first adhesive and the second adhesive extend beyond the outer perimeter of the membrane laminate to define a tab.

16. The acoustic vent of claim 8, wherein the PTFE membrane is a composite.

17. The acoustic vent of claim 8, wherein the PTFE membrane is black.

18. The acoustic vent of claim 8, wherein the total harmonic distortion of the acoustic vent is less than the PTFE membrane alone.

19. The acoustic vent of claim 8, wherein the thickness of the acoustic laminate is less than 30% of the total thickness of the scrim layer and PTFE membrane before lamination.

* * * * *

UNITED STATES PATENT AND TRADEMARK OFFICE
CERTIFICATE OF CORRECTION

PATENT NO. : 9,875,733 B2  
APPLICATION NO. : 15/029508  
DATED : January 23, 2018  
INVENTOR(S) : Jacob Sanders Page 1 of 1

It is certified that error appears in the above-identified patent and that said Letters Patent is hereby corrected as shown below:

In the Claims

Claim 1, Column 17, Line 9, "the with the acoustic laminate, wherein the first adhesive and" should read --the acoustic laminate, wherein the first adhesive and--

Signed and Sealed this  
Third Day of July, 2018

Andrei Iancu  
*Director of the United States Patent and Trademark Office*